(No Model.) 2 Sheets—Sheet 1.

J. M. TALLEY.
DEVICE FOR MEASURING AND FOLDING DRESS GOODS, &c.

No. 464,904. Patented Dec. 8, 1891.

Witnesses
Jas. L. McCathran
Wm. Ragger

Inventor
James M. Talley
By his Attorneys,
C. A. Snow & Co.

(No Model.) 2 Sheets—Sheet 2.

J. M. TALLEY.
DEVICE FOR MEASURING AND FOLDING DRESS GOODS, &c.

No. 464,904. Patented Dec. 8, 1891.

Witnesses
Jas. K. McCathran
Wm. Bagger

Inventor
James M. Talley
By his Attorneys,
C.A.Snow & Co.

UNITED STATES PATENT OFFICE.

JAMES MILTON TALLEY, OF MESQUITE, TEXAS.

DEVICE FOR MEASURING AND FOLDING DRESS GOODS, &c.

SPECIFICATION forming part of Letters Patent No. 464,904, dated December 8, 1891.

Application filed August 4, 1890. Renewed October 30, 1891. Serial No. 410,409. (No model.)

*To all whom it may concern:*

Be it known that I, JAMES MILTON TALLEY, a citizen of the United States, residing at Mesquite, in the county of Dallas and State of Texas, have invented a new and useful Device for Measuring and Folding Dress Goods, &c., of which the following is a specification.

This invention relates to devices for measuring and folding dress goods and other textile fabrics; and it has for its object to provide a device of this class which shall be simple in construction, by means of which the material may be quickly and accurately measured and folded upon a revolving reel, from which it may be afterward conveniently removed, and which shall be provided with an indicator to show the exact quantity of material which has been measured off and wound upon the said reel.

The invention consists in the improved construction, arrangement, and combination of parts which will be hereinafter fully described, and particularly pointed out in the claims.

Figure 1:
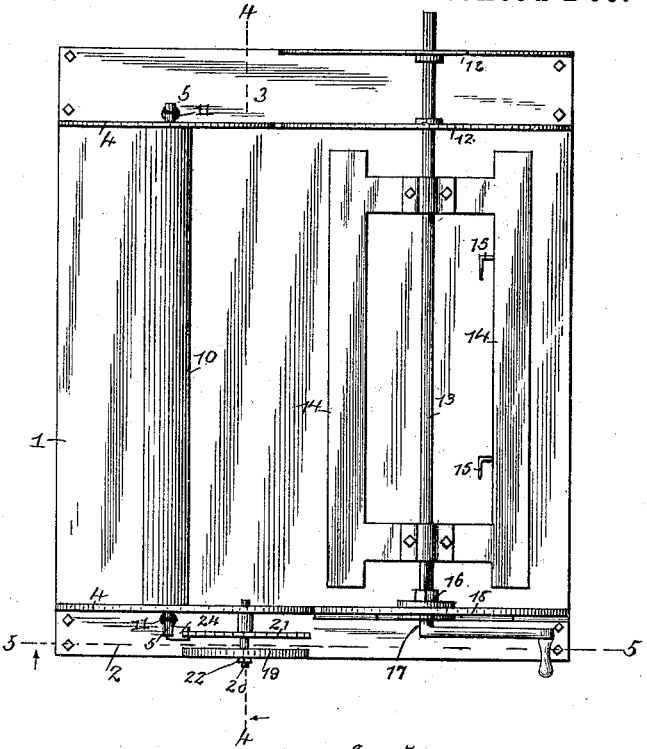
Figure 2:
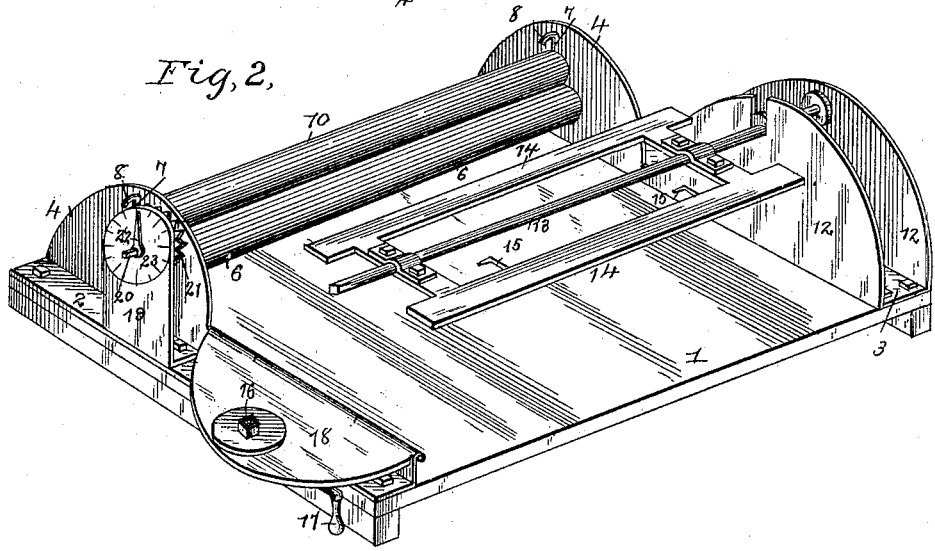
Figure 3:
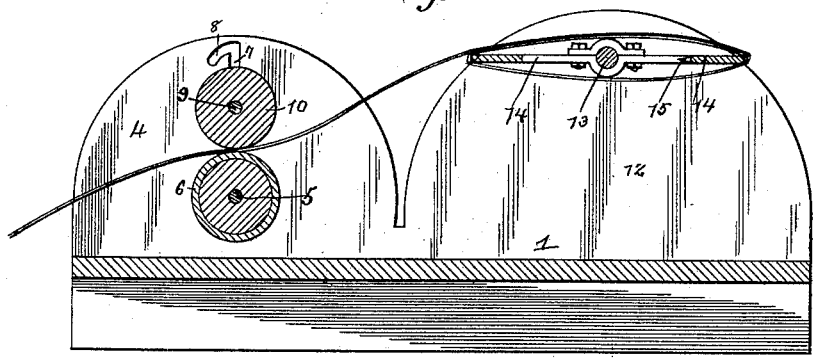
Figure 4:
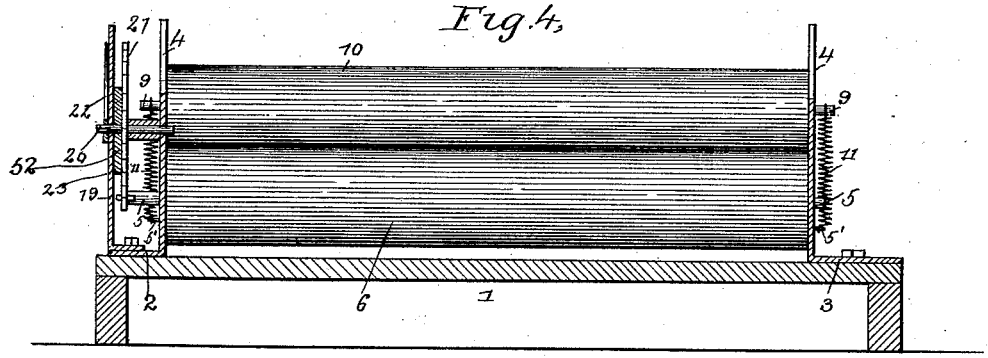
Figure 5:
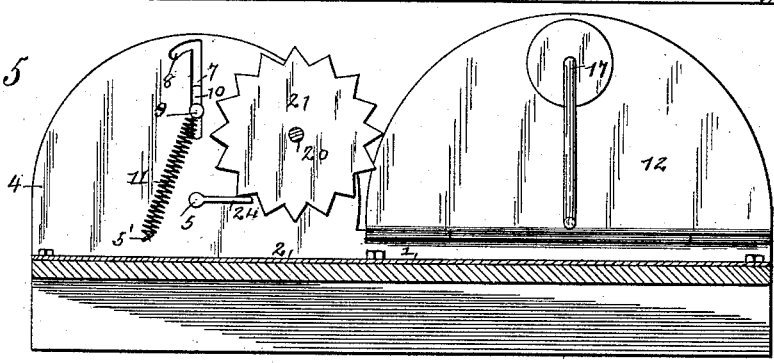
Figure 6:
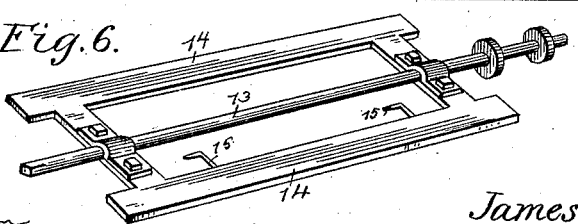

In the drawings hereto annexed, Figure 1 is a plan view of a machine embodying my improvements. Fig. 2 is a perspective view showing the same machine in position for permitting a roll of goods to be removed from the revolving reel. Fig. 3 is a longitudinal sectional view of the machine, as shown in Fig. 1. Fig. 4 is a transverse sectional view taken on the line 4 4 in Fig. 1. Fig. 5 is a longitudinal sectional view taken on the line 5 5 in Fig. 1. Fig. 6 is a detail view of the revolving reel.

Like numerals of reference indicate like parts in all the figures.

1 designates a suitable base, upon which are mounted the parallel flanges 2 and 3, arranged, respectively, at the front and rear edges of said base. The said flanges are provided with vertical brackets 4, having bearings for a shaft 5, carrying a roller 6, which is to be covered with rubber or other suitable material in order to secure the requisite degree of friction for the successful operation of the machine. In the brackets 4, above the bearings for the shaft 5, are formed vertical slots 7, provided at their upper ends with notches 8. 9 is a shaft which is mounted to slide vertically in the vertical slots 7 and which carries a roller 10, made of hard wood and adapted to bear against the roller 6. To the projecting ends of the shaft 9 are attachd coiled springs 11, the lower ends of which are made fast to the brackets 5'. The tension of said springs will hold the roller 10 in contact with the roller 6, except when the shaft 9 is raised against the tension of the springs, and is mounted in the notches 8 at the upper ends of the slots 7. The flange 3 at the rear edge of the base 1 is provided with vertical brackets 12 adjacent the bracket 4, and said brackets are provided with bearings for a shaft 13, which is mounted removably therein. The shaft 13 carries a suitably-constructed reel 14, one of the longitudinal bars of which is provided at its inner edge with sharp-pointed hooks 15. The front end of the reel-shaft 13 is squared and is adapted to engage a socket 16, formed in a crank-shaft 17, which is journaled in a bracket 18, hinged to the flange 2 at the front edge of the base-board in alignment with the brackets 12. When the bracket 18 is in the position shown in Fig. 1, with the socket 16 of crank-shaft 17 engaging the front end of the reel-shaft, the latter may be conveniently rotated by simply manipulating the crank at the front end of shaft 17.

19 designates a bracket extended vertically from the front flange 2 in front of the bracket 4 of the latter. Said brackets 4 and 19 are provided with bearings for a shaft 20, carrying a spur-wheel 21 and having at its front end a hand or pointer 22, which travels over a dial 23 upon the front side of the bracket 19. The shaft 5, carrying the roller 6, is provided at its front end with a pawl or arm 24, adapted to engage the spur-wheel 21 and to rotate the latter the space of one tooth to each revolution of the shaft 5. A suitable friction-washer, as 52, may be employed to retain the shaft 20, carrying the pointer 22, at any position to which it may be adjusted.

The operation and advantages of my invention will be readily understood from the foregoing description, taken in connection with the drawings hereto annexed. When the machine is not in use, the shaft 9, carrying the roller 10, may rest in the notches 8 at the upper ends of the slots 7, or it may be placed in said notches just previous to using the machine. The material which is to be measured and folded is inserted between the rollers 6 and 10, and the latter is then immediately placed in contact with the former by releasing the shaft 9 from the notches 8, when the springs 11 will serve to force the shaft carrying the said roller in a downward direction. The roller 6 is to be made of a certain known circumference—say nine inches—so that when the rollers 6 and 10 are revolved the dial 23 will indicate the exact number of yards of material passing between them. The end of the fabric is attached to the hooks 15 of the reel 14, and the latter is then revolved by means of the crank-shaft 17 until the desired quantity of material has been wound thereon. The material may then be cut and the hinged bracket 18 lowered to the position shown in Fig. 2 of the drawings, when the material wound upon the reel may be readily slipped off the latter and wrapped.

By this device dress goods and all textile materials may be measured and folded in a neater and more expeditious way than by the ordinary method of measuring by means of a yard-stick, and the registering-dial with which the machine is provided will accurately indicate the exact quantity of material which has been wound upon the reel.

The device is simple of construction and inexpensive, and may be readily attached or mounted upon the counter of the store or establishment where it is to be used.

After a certain quantity of material has been measured it will be seen that the arm or pawl extending from the shaft of the measuring-roller by slightly rotating the latter may be thrown out of engagement with the spur-wheel 21 upon shaft 20 to permit the latter and the hand or pointer thereon to be restored to normal position.

Having thus described my invention, I claim—

1. The combination of the base, the flanges having the vertical brackets, a shaft journaled in said brackets and carrying a roller, a shaft mounted in vertical slots in said brackets, carrying a roller, and springs serving to force the latter shaft in a downward direction, and means for supporting the upper roller out of contact with the lower roller, substantially as set forth.

2. The combination of the base, the flanges at the front and rear edges of the same, the shafts mounted in brackets extending upwardly from said flanges, the rollers mounted upon said shafts, springs arranged to force said rollers in contact with each other, and a removable reel to wind the material passing between said rollers and having hooks for the attachment of said material, substantially as and for the purpose set forth.

3. The combination of the base, the flanges at the front and rear edges of the same, the brackets extending upwardly from said flanges, a roller covered with rubber or equivalent material, a spring-actuated roller adapted to bear against the former roller, means for supporting the shaft of the spring-actuated roller out of contact with the rubber-covered roller, a shaft having a reel adapted to wind material passing between the said roller, a hinged bracket, and a crank-shaft journaled in the latter and adapted to be connected detachably with the reel-shaft, substantially as set forth.

4. In a machine of the class described, a shaft mounted in suitable bearings and carrying a reel provided with sharp-pointed hooks, in combination with a hinged bracket and a crank-shaft journaled in the latter and adapted to be connected detachably with the reel-carrying shaft, substantially as set forth.

5. The combination of the measuring-roller, the friction-roller, the springs adapted to hold the latter in contact with the former, an arm or pawl extending from the shaft of the measuring-roller, a shaft carrying the spur-wheel engaged by said arm or pawl, and a hand traveling over a suitable dial, a shaft journaled in suitable bearings and carrying a winding-reel, and a hinged bracket having a crank-shaft adapted to be detachably connected with one end of the reel-shaft, substantially as and for the purpose set forth.

In testimony that I claim the foregoing as my own I have hereto affixed my signature in presence of two witnesses.

JAMES MILTON TALLEY.

Witnesses:
C. H. BANCROFT,
L. D. WESSON.